INVENTORS
ROBERT J. GREENLER
EUGENE H. AUGUSTIN

ATTORNEY

INVENTORS
ROBERT J. GREENLER
EUGENE H. AUGUSTIN
BY

ATTORNEY

July 16, 1968 R. J. GREENLER ETAL 3,393,061
METHOD AND APPARATUS FOR PREVENTING BUBBLES
IN FLOAT GLASS APPARATUS
Filed Oct. 19, 1965 3 Sheets-Sheet 3

INVENTORS
ROBERT J. GREENLER
EUGENE H. AUGUSTIN
BY

ATTORNEY

United States Patent Office 3,393,061
Patented July 16, 1968

3,393,061
METHOD AND APPARATUS FOR PREVENTING BUBBLES IN FLOAT GLASS APPARATUS
Robert J. Greenler, Nashville, Tenn., and Eugene H. Augustin, Dearborn Heights, Mich., assignors to Ford Motor Company, Dearborn, Mich., a corporation of Delaware
Filed Oct. 19, 1965, Ser. No. 497,949
7 Claims. (Cl. 65—99)

ABSTRACT OF THE DISCLOSURE

A tank for the manufacture of flat glass by the float process has a metal containing cavity therein defined by a plurality of refractory ceramic blocks. Molten metal is received in the cavity. A liner of material less dense than the metal bath is supported in a position both submerged in the metal bath and spaced above the refractory blocks forming the bottom of the metal receiving cavity. The metal forming the bath occupies spaces above and below the liner and the spaces are interconnected so that the hydrostatic head applied to the refractory material is calculated on the basis of the height and the density of the metal bath material alone.

---

This invention relates to the manufacture of flat glass by the so-called "float" process, wherein the glass is formed on the surface of a molten bath to obtain a glass ribbon having true parallelism of its opposite faces and a lustrous, fire-polished surface finish.

The "float" process involves forming or floating a sheet or ribbon of glass on the surface of a molten bath of a metal or salt which has a greater density than that of glass, preferably tin, with or without small amounts of alloying elements. By more or less conventional means, molten glass is delivered at a uniform rate to the bath to form a ribbon which is advanced along the surface of the bath under thermal conditions which permit the ribbon to harden sufficiently to be removed at the end of the bath without harming the surface of the ribbon.

The bath is contained within an enclosed tank structure which comprises lower and upper refractory sections joined together except for restricted entrance and exit passageways through which molten glass is fed to and the glass ribbon removed from the tank structure. The lower refractory section supports the pool of molten metal. The space above the metal bath contains a protective gas preventing oxidation of the bath.

It has been found that under certain conditions when the bath is contained within a refractory wall, there will be a continued gassing of the refractory, releasing bubbles which pass upwardly through the metal bath and are trapped against the underside of the ribbon, creating surface depressions or indentation defects in the underside of the glass and rendering it unusable. The exact origin of and reason for this evolution of gas is uncertain, but it appears that it passes through the refractory from the atmosphere above the molten bath by transpiration due to the differential in temperature and due to the pore size of the refractory. This can be prevented by increasing the depth of the bath so as to increase the hydrostatic head on the refractory surface beneath the ribbon. This, however, requires additional molten metal and entails other disadvantages.

According to the present invention, a solid material, which may be in slab form, is used to line the lower refractory section of the tank structure beneath the glass ribbon, the slabs being slightly spaced from the refractory bottom wall and the joints being open to permit the entrance of molten bath material so as to subject the refractory to a hydrostatic head equal to the total depth of the bath multiplied by the density of the bath material.

In accordance with a preferred embodiment of this invention, solid slabs, preferably manufactured from a carbonaceous material such as graphite, are secured in position to line the refractory bottom of the tank structure beneath the glass ribbon. Inasmuch as graphite is less dense than the tin bath customarily used, it is necessary to anchor the slabs against being buoyantly raised by the bath and floating to the top. The molten bath is permitted to enter between the joints of the graphite slabs and between the slabs and the refractory forming the bottom of the container so as to subject the refractory to a total hydrostatic head equal to the total depth of the tin bath multiplied by its density. This construction may be obtained by restraining the slabs by a series of interlocked graphite keys which are retained in keyways in the lower refractory.

Graphite slabs possess a thermoconductivity exceeding that of molten tin, thereby promoting a uniform temperature across the width of the ribbon despite the substantial reduction in the depth of the tin bath above the slabs.

Among the objects of the present invention are to prevent the formation of gaseous bubbles in the bath beneath the glass ribbon; to minimize the depth of molten bath required to support the glass ribbon during processing, consistent with maintaining a high-quality product; and generally to improve the quality of glass manufactured by the float process.

Other objects, and objects relating to details of construction and operation will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

Figure 1:
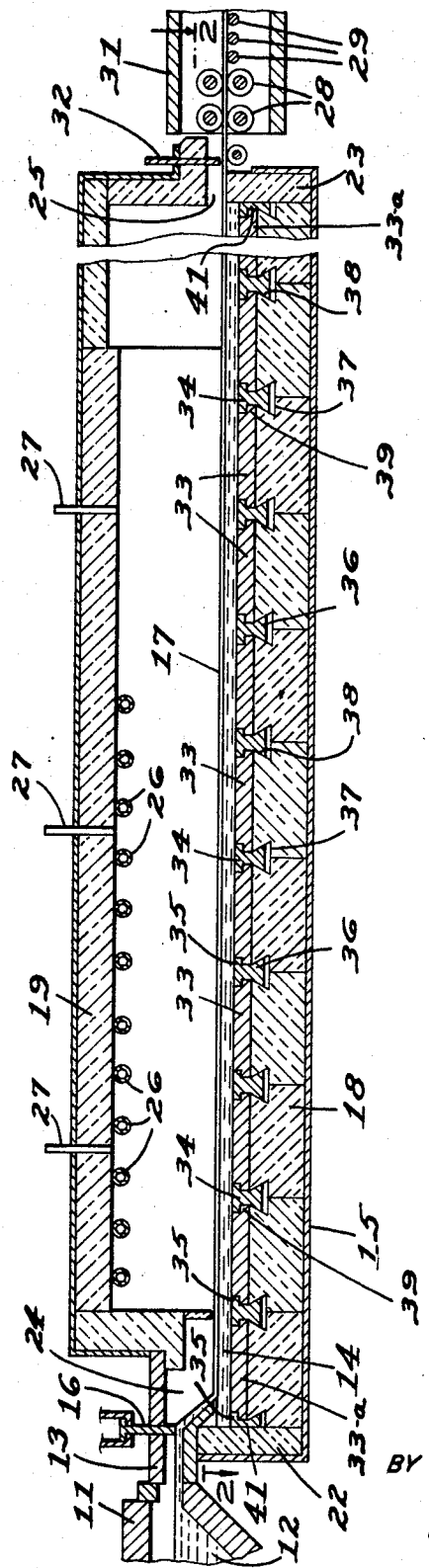
FIGURE 1 is a diagrammatic longitudinal section of a float glass tank structure incorporating this invention.

Referring now to the drawings, in FIGURE 1 is seen the delivery end of a conventional glass melting furnace 11 in which a constant level of glass 12 is maintained. The molten glass 12 is delivered through a forehearth 13 onto the surface of a bath 14 of molten metal or salt contained within a tank structure 15. A gate 16 controls the rate of glass 12 flowing from the furnace 11. The molten bath 14 has a density greater than that of the glass 12 so that the glass will float on the surface of the bath 14. By delivering molten glass at a constant rate and withdrawing the continuous sheet thus formed at a constant rate, a continuous glass ribbon of uniform width is produced. Preferably the bath 14 is a pool of molten tin, an alloy of tin or the like.

The tank structure 15 comprises a lower refractory section 18, an upper refractory section 19, sidewalls 21 and end walls 22 and 23 joined together except for a restricted entrance 24 and exit 25 to provide a substantially enclosed chamber. The sidewalls 21 and end walls 22 and 23 project above the top surface of the lower refractory 18 to define a container for the pool of molten tin 14.

To maintain the tin in a molten condition and the glass ribbon 17 at the proper temperatures required to form a ribbon of good optical quality, thermal regulation means such as electrical heaters 26 are installed in the roof of the tank structure 15. Heaters or electrodes may also be installed in the bath 14 if desired. Cooling means also may be provided to assure that the glass ribbon 17 will be sufficiently cooled and hardened to be removed through the exit 25 without damage to the ribbon. The heaters 26 are connected to a conventional power source (not shown) and may be individually controlled to provide the desired thermal gradient between the various zones of the tank structure 15 to obtain the desired rate of cooling of the ribbon 17.

Preferably, the glass 12 is introduced into the tank structure 15 at a temperature of about 1850° F. and then, the glass ribbon 17 is progressively cooled to a temperature of about 1100° F. at the exit 25.

A gas is introduced into the chamber through conduits 27 to provide a protective atmosphere. The gas should be inert or reducing to the components of the bath. Such gases as nitrogen and/or hydrogen have been used for this purpose.

The cooled glass ribbon 17 is withdrawn by driven traction rolls 28 onto a conveyor 29 to enter an annealing lehr 31 where the ribbon 17 is further cooled under controlled conditions to remove or reduce residual stresses therein.

The exit 25 of the tank structure may be provided with a sealing arrangement 32 to retain the protective gas in and prevent the entrance of outside atmosphere to the chamber.

Figure 2:
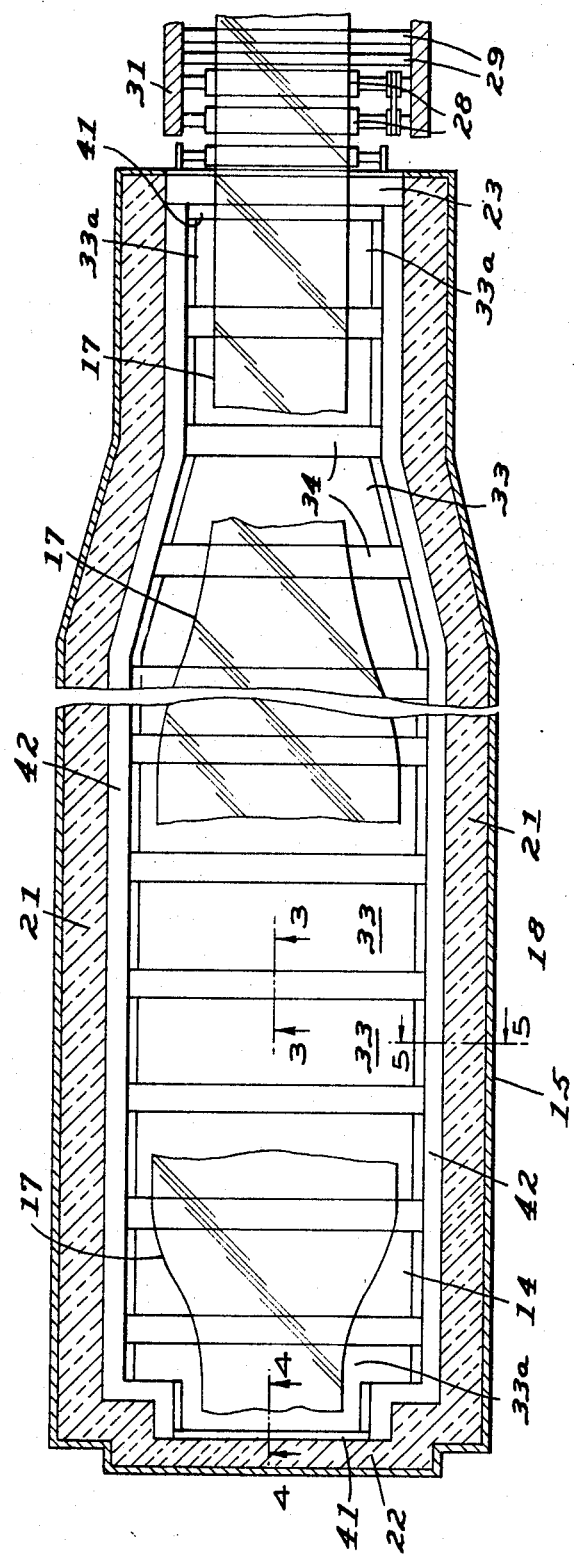
FIGURE 2 is a horizontal section of the tank taken along the line 2—2 of FIGURE 1, a portion of the glass ribbon being indicated.

In order to permit the reduction of the depth of the molten tin without reducing the effective hydrostatic head on the refractory beneath the ribbon, a series of rectangular slabs 33, preferably of a solid carbonaceous material such as graphite, are provided. The slabs 33 preferably are installed so as to cover the entire bottom area as best seen in FIGURE 2. In FIGURE 2, portions of the glass ribbon 17 have been cut away to more clearly depict the slab installation.

Each slab 33 is held in position by a transversely extending anchoring or hold-down means such as a key 34 which may also be made of graphite and which engages the two opposite transversely extending sides of each slab 33. The longitudinally extending sides of adjacent slabs abut. The joints between adjacent slabs are not sealed and the molten tin bath is permitted to flow under the slabs.

Figure 3:
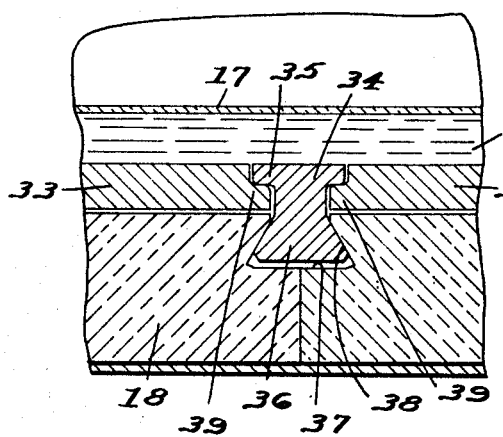
FIGURE 3 is a fragmentary enlarged vertical section through the tank structure taken along line 3—3 of FIGURE 2.

As best seen in FIGURE 3, the key 34, which extends across the width of the bath, has an upper T-shaped portion 35 and a lower tenon part 36. The lower refractory 18 has transversely extending keyways 37 in the form of mortises 38 interlockingly receiving the tenon parts 36 of the keys 34 to effect dovetail connections therebetween. The mortise 38 in the lower refractory 18 is slightly greater in depth than the length of the tenon part 36 so as to provide clearance between the key 34 and keyway 37. The transversely extending sides of each slab 33 have stepped portions 39 to engage the side of the T-shaped part 35 of the keys 34.

The slabs 33 of graphite will be raised slightly by the buoyancy exerted upon the slabs 33 by the molten tin until the stepped portions 39 engage the upper T-shaped parts 35 of the keys 34. The upper parts 35 of the keys 34 are retained well below the surface of the molten tin in the bath 14. A depth of the tin bath of several inches is maintained to reduce the likelihood of the glass ribbon 17 coming into contact with the slab 33 in case the ribbon buckles within the tank structure 15.

Figure 4:
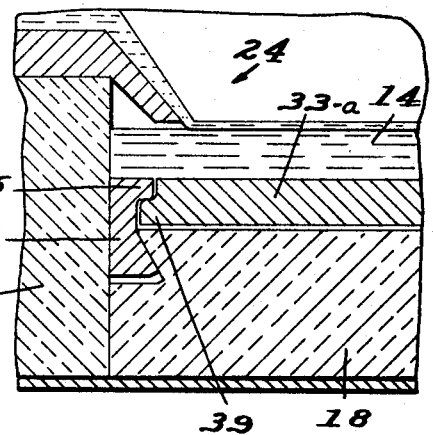
FIGURE 4 is a fragmentary enlarged vertical section through the tank structure taken along line 4—4 of FIGURE 1.

FIGURE 4 shows a sectional view of the hold-down means for end slabs 33-a at the entrance 24 of the tank structure 15. The end slabs 33-a at the entrance 24 and also at the exit 25 are held by split or half keys 41 which are formed as one-half of key 34. The flat surface of the split key 41 abuts the end wall 22 while the remaining half of the T-shaped upper part 35 projects into the said bath 14. The split key 41 functions in the same manner as key 34 to retain the end slabs 33-a.

Figure 5:
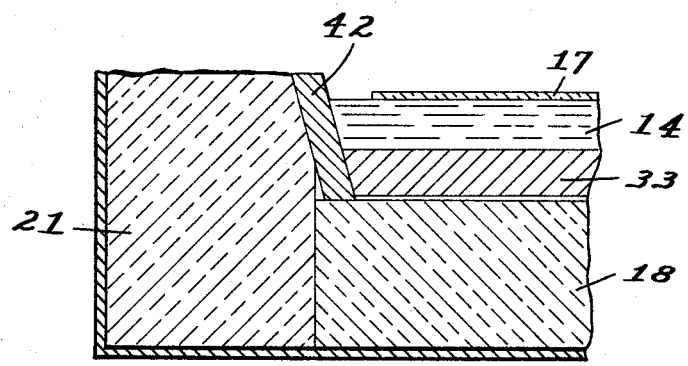
FIGURE 5 is a fragmentary enlarged vertical transverse section taken along line 5—5 of FIGURE 2.

A vertical section through the side of the tank structure 15 is shown in FIGURE 5. The sidewall 21 projects above the top surface of the lower refractory 18. The inward facing surface of the upper portion of the sidewall 21 is sloped. A side block 42 of a carbonaceous material, preferably graphite, is held against this sloped surface by conventional fastening means (not shown). The side block 42 extends to the lower refractory 18 to prevent the glass ribbon 17 from contacting the sidewall 21.

As can be readily understood from viewing FIGURES 2–5, the slabs 33 are retained by the keys 34 and 41 with the molten tin entirely encompassing the slabs 33. The slabs 33 are fabricated from a material that is of a density less than the molten bath so that the rising slabs will be retained in a submersed position by the keys 34 and 41. Graphite has proven a very satisfactory material for this reason, but other solid materials as, for example, foamed silicate structures coated with boron nitride or graphite may be utilized. The keys and slabs should be fabricated from a material that will not adhere to glass in case portions of the ribbon 16 accidentally project into the bath 14.

An additional advantage of using graphite slabs is that such slabs have a thermal conductance which is of equal or greater magnitude than the conductance of the molten tin. The loss of heat at the edges of the bath 14 is greater than at the center, which results in more rapid cooling of the sides of the glass ribbon. Graphite or any other material which has a high thermal conductance will, in conjunction with the molten tin, transfer heat from the center to the edges of the bath 14 more quickly to bring about a more uniform temperature across the entire width of the ribbon 17 floating on the molten bath.

Also, the use of a solid material in the bath to replace a portion of the molten metal reduces convection currents that have been detrimental to the obtaining of uniform, controllable heat distribution. Thus, the application of this invention results in a more effective heat distribution in the bath with less depth of molten tin than heretofore possible.

The slabs 33 will displace an equivalent volume of molten metal, thereby allowing a substantial reduction in the volume of molten metal which would be otherwise required to maintain an effective hydrostatic head of molten metal to prevent the evolution of gas bubbles from the lower refractory. Attempts to eliminate transpiration of bubbles through the lower refractory 18 by other methods such as sealing the bottom of the tank structure 15 or applying a vacuum thereto have been unsuccessful due to design limitations inherent in tank structures of a size sufficiently large for commercial production of float glass.

It will be understood that various modifications in structure and substitution of materials may be made without departing from the spirit and scope of the invention as defined in the appended claims.

We claim:

1. A method of reducing the number of indentation defects caused by gas bubbles engaging a glass ribbon developed when molten glass is flowed out upon a molten metal bath located within a cavity defined in a refractory material and contained in a substantially enclosed tank having an atmosphere therein substantially nonreactive with said metal, which method comprises the steps of: mounting within said molten bath of metal at a location spaced above the surface of said refractory defining the bottom of said cavity a material which is both less dense than said metal forming said bath and nonreactive therewith; flowing said metal forming said bath into spaces both between said material and said refractory and between said material and said glass ribbon floating on said bath; and interconnecting said metal in said spaces on either of said material whereby the hydrostatic head applied to said refractory defining said cavity bottom is calculated by the total height and density of the metal bath material alone, the hydrostatic head applied by the metal bath providing a sufficient force on said refractory that gas bubbles emanating therefrom are substantially reduced whereby the number of indentation defects occurring in said glass ribbon as a result of gas bubbling is substantially reduced.

2. A method of reducing the number of indentation defects caused by gas bubbles engaging a glass ribbon developed when molten glass is flowed out upon a molten metal bath located within a cavity defined in a refractory material and contained in a substantially enclosed tank having an atmosphere therein substantially nonreactive with said metal, which method comprises the steps of: positioning liner slabs within said molten bath of metal, said liner slabs being formed of a material which is both less dense than said metal forming the bath and nonreactive therewith; confining said slabs within said molten metal containing cavity so that said slabs are buoyed up by said molten metal to leave a space of metal between themselves and the bottom of the refractory and so that said slabs are not free to rise to the top of said bath and float thereupon whereby a space of metal is created between said liner slabs and said glass ribbon floating on said metal bath; flowing said metal forming said bath in to said space both between said material and said refractory and between said material and said glass ribbon floating on said metal; and interconnecting said two areas of metal on either of said material whereby the hydrostatic head applied to said refractory defining said cavity bottom is calculated by the total height and density of the metal bath material alone, the hydrostatic head applied by the metal bath providing a sufficient force on said refractory that gas bubbles emanating therefrom are substantially reduced whereby the number of defects occurring in said glass ribbon as a result of gas bubbling is substantially reduced.

3. A tank for the manufacture of flat glass by the float process which comprises: a plurality of refractory ceramic blocks forming a refractory ceramic lining with a cavity therein for receiving and supporting a molten metal bath therewithin; molten metal received in said cavity and forming said molten metal bath upon which molten glass may be poured and processed so as to form a glass ribbon; a liner of a material both less dense than and chemically nonreactive with said metal bath; means for supporting said liner in a position both submerged in said metal bath and spaced above the surface of said refractory ceramic lining which defines the bottom of said cavity; and openings interconnecting spaces above and below said liner such that said metal bath forms a continuous medium on both sides of said liner whereby the hydrostatic head applied to said refractory material defining said cavity bottom is computed by the total height and density of said molten metal; and whereby the maximum hydrostatic head is applied to the refractory ceramic lining although portions of the volume which could be occupied by said bath metal are occupied by a material substantially less dense than said bath metal.

4. A tank for the manufacture of flat glass by the float process which comprises: a plurality of refractory ceramic blocks forming a refractory ceramic lining with a cavity therein for receiving and supporting a molten metal bath therewithin; molten metal received in said cavity and forming said molten metal bath upon which molten glass may be poured and processed so as to form a glass ribbon; liner slabs of a material both less dense than and chemically nonreactive with said metal bath; means for supporting said liner slabs in a position both submerged in said metal bath and spaced above the surface of said refractory ceramic lining which defines the bottom of said cavity; and openings between adjacent ones of said liner slabs, said openings interconnecting spaces above and below said liner slabs such that said metal bath forms a continuous medium on both sides of said liner slabs whereby the hydrostatic head applied to said refractory material defining said cavity bottom is computed by the total height and density of said molten metal; and whereby the maximum hydrostatic head is applied to the refractory ceramic lining although portions of the volume which could be occupied by said bath metal are occupied by a material substantially less dense than said bath metal.

5. The tank for the manufacture of flat glass by the float process as defined in claim 4 wherein said means for supporting said liner slabs are keys formed of the same material as said liner slabs, the top portion of said keys being interposed between and interengaged with adjacent slabs and the bottom portion being anchored to the refractory ceramic block forming said refractory ceramic lining.

6. The tank for the manufacture of flat glass by the float process as defined in claim 5 wherein said slabs and said keys are formed from a carbonaceous material and wherein said bath metal is tin.

7. The tank for the manufacture of flat glass by the float process as defined in claim 6 wherein said carbonaceous material is graphite.

References Cited

UNITED STATES PATENTS

| 3,134,660 | 5/1964 | Long | 65—374 |
|---|---|---|---|
| 3,332,763 | 7/1967 | Basler et al. | 65—99 |
| 3,334,983 | 8/1967 | Badger et al. | 65—182 |

DONALL H. SYLVESTER, *Primary Examiner.*

E. R. FREEDMAN, *Assistant Examiner.*